United States Patent [19]

Loeser

[11] 3,939,314

[45] Feb. 17, 1976

[54] SAFETY DEVICE FOR POWER-OPERATED PRESSES AND THE LIKE

[75] Inventor: John K. Loeser, Mayfield Village, Ohio

[73] Assignee: The Positive Safety Manufacturing Company, Eastlake, Ohio

[22] Filed: June 24, 1974

[21] Appl. No.: 482,445

[52] U.S. Cl. .......... 200/61.42; 192/129 A; 192/134

[51] Int. Cl.$^2$ ........................ H01H 3/16; F16D 9/00

[58] Field of Search .......... 200/61.42, 61.58 R, 332, 200/153 T, 17 R, 18; 100/53; 83/68, DIG. 1; 192/129 R, 129 A, 134, 143; 74/613, 615

[56] References Cited

UNITED STATES PATENTS

| | | | |
|---|---|---|---|
| 2,400,486 | 5/1946 | Carlyle | 192/134 |
| 2,454,341 | 11/1948 | Repka | 200/332 X |
| 2,821,610 | 1/1958 | Thomson et al. | 200/332 |
| 3,198,925 | 8/1965 | Starrantino | 200/332 |
| 3,315,049 | 4/1967 | Cain | 200/61.42 |
| 3,487,182 | 12/1969 | Grundy | 200/61.42 |
| 3,646,883 | 3/1972 | Provi | 192/129 A X |

*Primary Examiner*—James R. Scott
*Attorney, Agent, or Firm*—Isler and Ornstein

[57] ABSTRACT

A safety device is provided for the operation of small presses, spot welding machines, etc. The device is characterized by the use of a probe or sensor whose movement, if obstructed, prevents closing of an electrical circuit which activates the punch or ram of the press. Means are provided for minimizing or eliminating bounce or vibration of the sensor to avoid erratic operation of the device and the press. Provision is also made for rendering the device "fail-safe" under certain conditions, including failure of internal parts of the device or improper usage of the device by the operator. Economies in manufacture of the device are effected by the improvement of certain parts and elimination of other parts of previously used devices of a similar nature and construction.

6 Claims, 8 Drawing Figures

SAFETY DEVICE FOR POWER-OPERATED PRESSES AND THE LIKE

This invention relates, as indicated, to a safety device, which is especially useful in the operation of small presses, such, for example, as used in riveting, for spot-welding machines, etc., but has reference more particularly, to improvements in the device shown in Grundy U.S. Pat. No. 3,487.182.

In the operation of the device disclosed in the aforesaid patent, it was found that the positional relationship between the actuating arm and limit switch closing arm was such as to cause a tendency of the probe to bounce or vibrate at the end of the downstroke of the probe shaft, thereby producing erratic operation of the device and the press.

It was also found, in the use of the device, that under certain conditions, as failure of internal parts or improper usage by the operator, the device was not "fail-safe."

It was further found that the device had embodied therein certain parts which were not necessary to the effective operation of the device and increased the cost of manufacture unnecessarily.

The present invention has, as its primary object, the provision of a device of the character described, which is "fail-safe" in operation or use.

Another object of the invention is the provision of a device of the character described, in which tendency of the sensor or probe of the device to bounce or vibrate and thus produce erratic operation of the device and the press has been eliminated.

A further object of the invention is to provide a device of the character described, in which certain parts have been improved or eliminated to reduce the overall cost of manufacture.

Other objects and advantages of my invention will be apparent during the course of the following description.

In the accompanying drawings forming a part of this specification, and in which like numerals are employed to designate like parts throughout the same, FIG. 1 is a front elevational view of the device, shown as mounted on a press;

Figure 1:
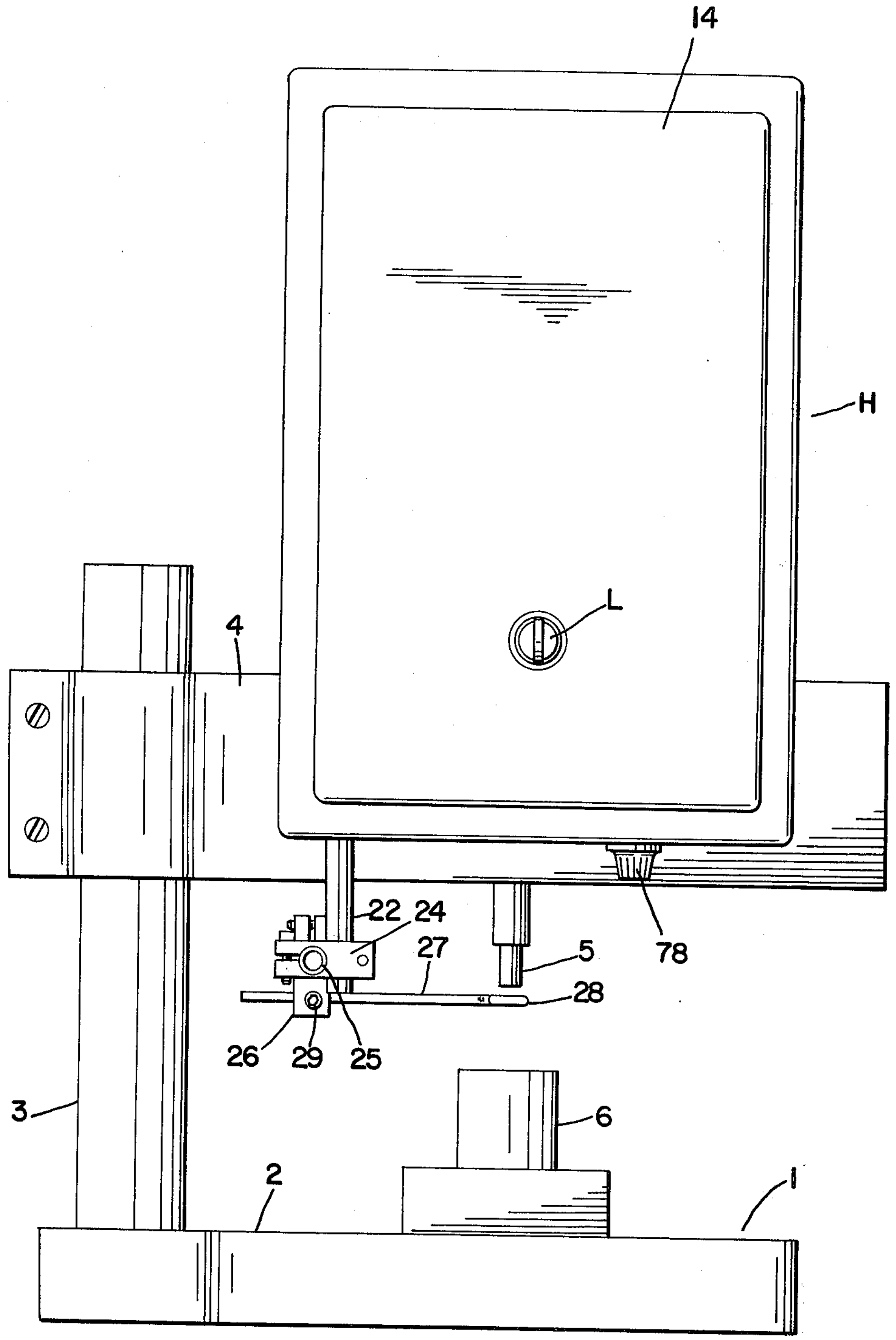

Referring more particularly to the drawings, there is illustrated a press 1, shown diagrammatically as having a base or bed 2, having an upright supporting column 3, which carries a fixed press-head 4. From the head 4, there extends downwardly an axially-movable power ram or punch 5 designed to coact with work-holding means 6, which is secured to the bed 2 in any suitable manner.

Electric power for actuation of the ram 5 is provided by an external two-wire or three-wire electric supply 7 (see FIG. 8), as required by electrical codes.

A normally-open foot or hand switch 8 is provided in the electric supply circuit, for the purpose of actuating the safety mechanism, which then provides a source of power for the solenoid S (see FIG. 8) which controls the actuation of the ram 5.

The components thus described form no part of the present invention, except in their relation to and their cooperation with the safety mechanism of the invention.

In accordance with the invention, the safety mechanism is enclosed in a housing or mounting box, generally designated by reference character H, and comprising a base plate or bottom 9 having flanges 10, 11, 12 and 13, and a flanged cover 14 which may, if desired, be locked to a lock bracket or keeper 15, by means of a key-operated lock L, to prevent access into the housing by unauthorized personnel. The keeper 15 is secured, as by screws 16, to the base plate 9.

The housing H is mounted on the head 4 of the press, as shown in FIG. 1, from which the major portion of the wiring is omitted, for purposes of clarity. The base plate 9 has mounted thereon all of the elements comprising the safety mechanism of the invention, which will now be described.

Secured to the base plate 9, is a bearing bracket assembly, comprising a bracket 17 having vertically-spaced flanges 18 and 19, bearings 20, secured in these flanges, and a guide rod 21 mounted in and extending between the flanges.

A probe shaft 22 is mounted for vertical reciprocal movement in the bearings 20, and extends through an opening 23 in the flange 12 of the housing.

Secured to the lower end of the shaft 22 is a clamp 24, to which is secured a tubular rod 25, to which, in turn, is secured a second clamp 26, having clamped thereto a sensor or probe 27 comprising a rod 27 which terminates in a loop 28. This sensor or probe is caused to feel or test the work area prior to any possibility of actuation of the ram 5; and only if the work area is operationally free of any foreign object can the sensor cause the ram to be actuated. This action is subject to proper adjustment of the safety mechanism, which adjustment will be presently described.

The sensor 28 is shown, in this instance, as in the shape of a loop, the axis of which is coaxial with the axis of travel of the ram 5, and the rod 27 is adjustably secured in the clamp 26 by means of a screw 29.

Secured to the probe shaft 22, as by means of a hollow head screw 30, is an actuator collar 31.

Mounted on the probe shaft 22, below the collar 31, is a Neoprene rubber washer 33, which, on the downstroke of the shaft 22, abuts the flange 19 of the bracket 17 to thereby absorb the energy of the downstroke and minimize vibration of the sensor 27.

The flange 18 of the bracket 17 has secured to one edge thereof, as by a screw 35, a leaf spring 36, to the upper end of which is secured, as by a screw 37, a drag or brake block 38, of a plastic material, such, for example, as Teflon. The block 38 bears resiliently and frictionally against a longitudinally inclined flat portion or surface 22a of the shaft 22 and thus acts to slow the movement of the shaft sufficiently to provide better control of the downward movement of the sensor.

The shaft 22 has adjustably secured thereto, as by means of a screw 39, a stroke adjusting collar 40, on which is superimposed a rubber washer 41, which is designed to function as a bumper to engage the lower surface of the flange 18 of the bracket 17 to thereby limit and cushion the upward movement of the shaft. This rubber bumper prevents metal to metal contact between the collar and flange, in addition to its normal shock-reducing function.

Figure 5:
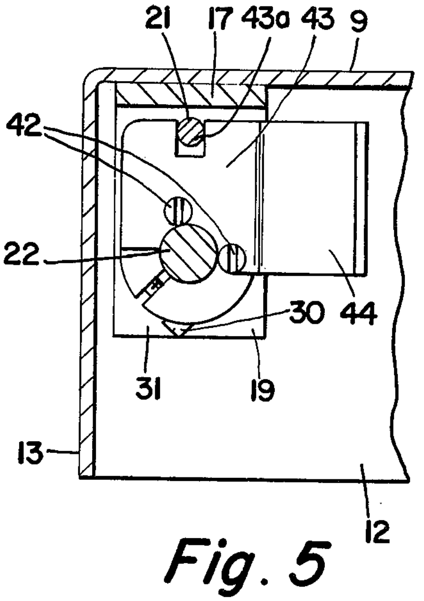
FIG. 5 is a fragmentary cross-sectional view, taken on the line 5—5 of FIG. 2.

Secured to the actuator collar 31, as by screws 42, is a switch actuator arm 43 having an angularly disposed terminal portion 44, which is designed to engage the roller 45 of the switch closing arm 46 of a normally-open limit switch 47 when the shaft 22 descends. The limit switch 47 is mounted on the base plate 9, in spaced relation to such plate. Rotation of the shaft 22 in the bearings 20 is precluded by reason of the fact that the switch actuator arm 43 is provided with a recess 43a (FIG. 5) through which the guide rod 21 extends, so that the guide rod insures rectilinear movement of the collar 31.

The safety mechanism further includes a solenoid 48 which is mounted on the base plate 9, and the armature of which is designated by reference numeral 49. The lower end of the armature 49 has secured thereto, as by a pin 50, an adapter 51. The lower end of the adapter 51 is secured, as by a pin 52, to the arms of a yoke 53, so that the yoke has a slight degree of pivotal movement relative to the armature. Mounted on the pin 52 between the arms of the yoke 53, is a roller 54, which serves a purpose to be presently described.

The lower end of the yoke 53 is secured to one end of an extension coil spring 55, the lower end of which is secured, as by a screw 56, to an anchor or post 57, which is mounted on the base plate 9.

The upper end of the shaft 22 is provided with a pin 58 which extends through a square bushing 59, which, in turn, is mounted for slidable movement in a slot 60 at one end of a pivot beam 61. The beam 61 is mounted for pivotal movement about a pedestal 62, which is mounted on the base plate 9. The other end of the beam 61 underlies and engages the roller 54, so that in the operation of the mechanism to be presently described, the roller facilitates movement of the beam.

The safety device further includes a relay 63, which is supported by the base plate 9 adjacent the flange 10.

A terminal strip 64 of insulating material is also provided, which is secured to the base plate 9 adjacent the flange 11, by means of screws 65 and 66, and is provided with bridged terminals A, B, C and D.

Figure 2:
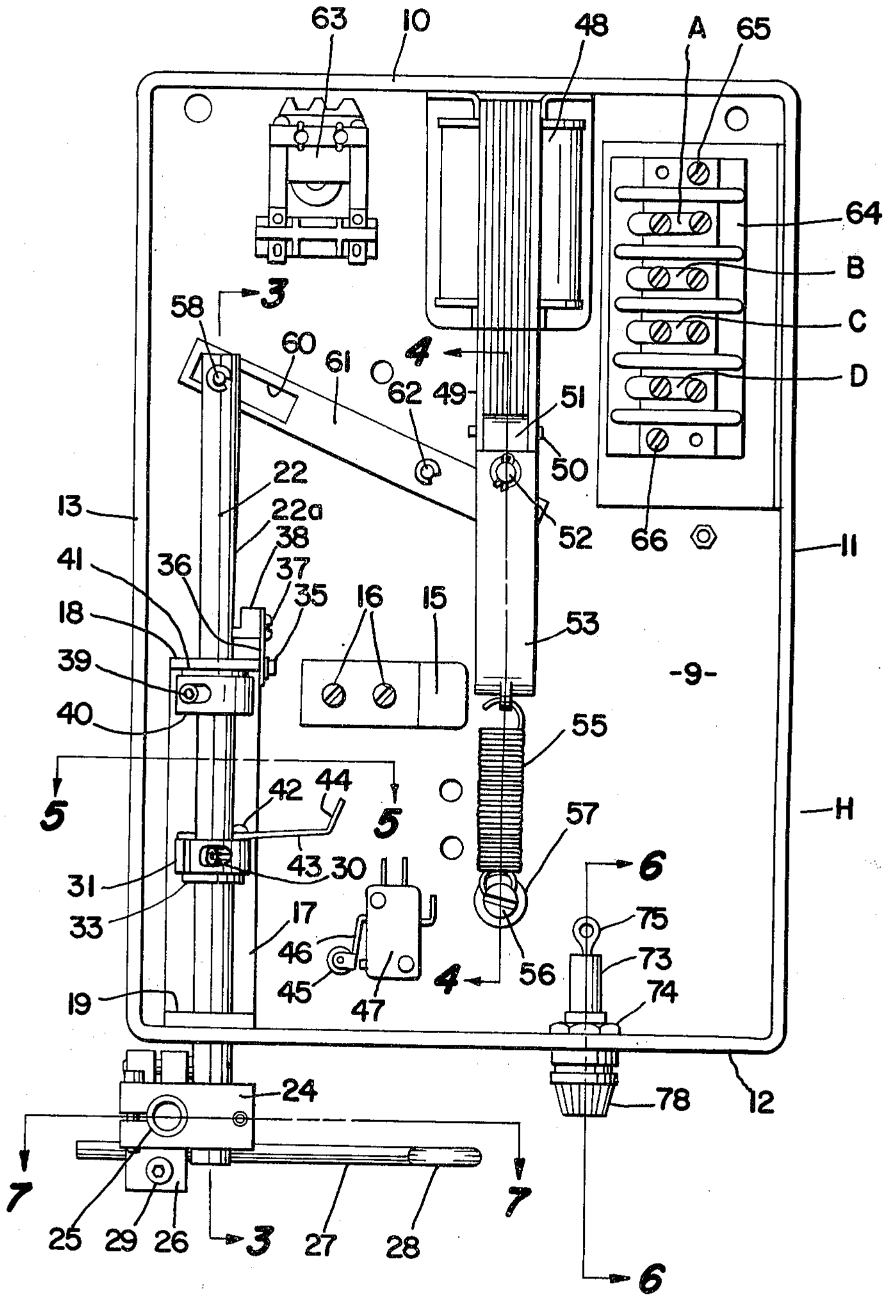
FIG. 2 is a front elevational view of the device, with the cover removed.
Figure 3:
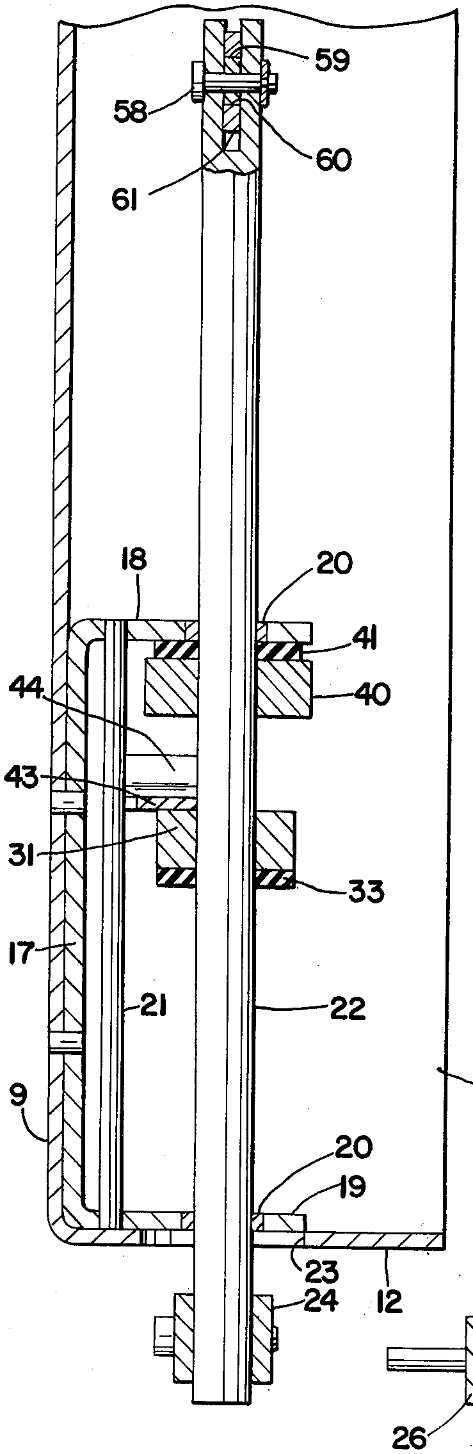
FIG. 3 is a fragmentary cross-sectional view, taken on the line 3—3 of FIG. 2.
Figure 4:
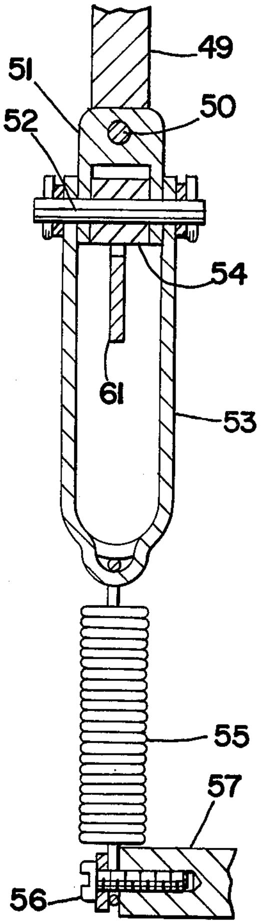
FIG. 4 is a fragmentary cross-sectional view, taken on the line 4—4 of FIG. 2.
Figure 6:
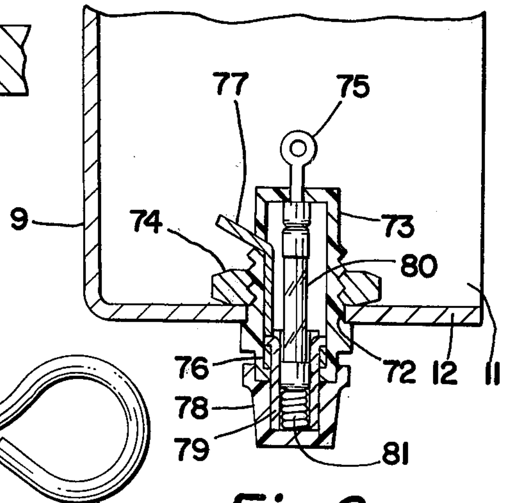
FIG. 6 is a fragmentary cross-sectional view, taken on the line 6—6 of FIG. 2.
Figure 7:
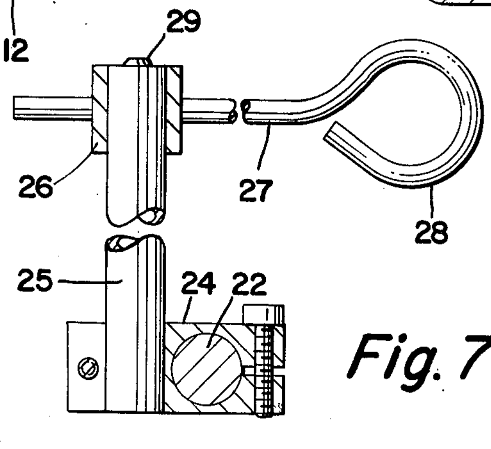
FIG. 7 is a cross-sectional view, taken on the line 7—7 of FIG. 2.

As best seen in FIGS. 2 and 6, the flange 12 of the base plate 9 is provided with an opening 72, in which a fuse housing 73 of plastic material is clamped, as by means of a lock nut 74. The housing has secured in its upper end a terminal 75, and in its lower portion a sleeve 76 of conductive material which terminates in a terminal 77, which extends through the wall of the housing.

A knob or cap 78 of a plastic material has embedded therein a sleeve 79 of conductive material, and is removably secured to the lower end of the housing 73, as by a bayonet joint connection between the sleeves 79 and 76.

A fuse 80, such, for example, as a Littelfuse No. 3AG-5A, is disposed within the housing 73 and is resiliently retained against the lower end of the terminal 75 by means of an extension coil spring 81, which is interposed between the lower end of the fuse 80 and the knob or cap 78.

In the event that the fuse 80 blows, the fuse may be removed from the housing 73, by a simple twist of the knob 78 sufficient to release the sleeve 79 from the sleeve 76, so that when the cap is withdrawn, the cap carries the spring and fuse with it.

Similarly, when the fuse is replaced, the replacement fuse is inserted into the cap, and the cap pushed upwardly and turned, so as to reconnect the sleeves 79 and 76.

The function of the fuse 80 will be explained in connection with the description of the operation of the mechanism, but, at this point, it may be noted that the fuse arrangement which has been described, is such as to enable a fuse to be removed and replaced without the necessity of removing the cover 14 of the housing H.

Figure 8:
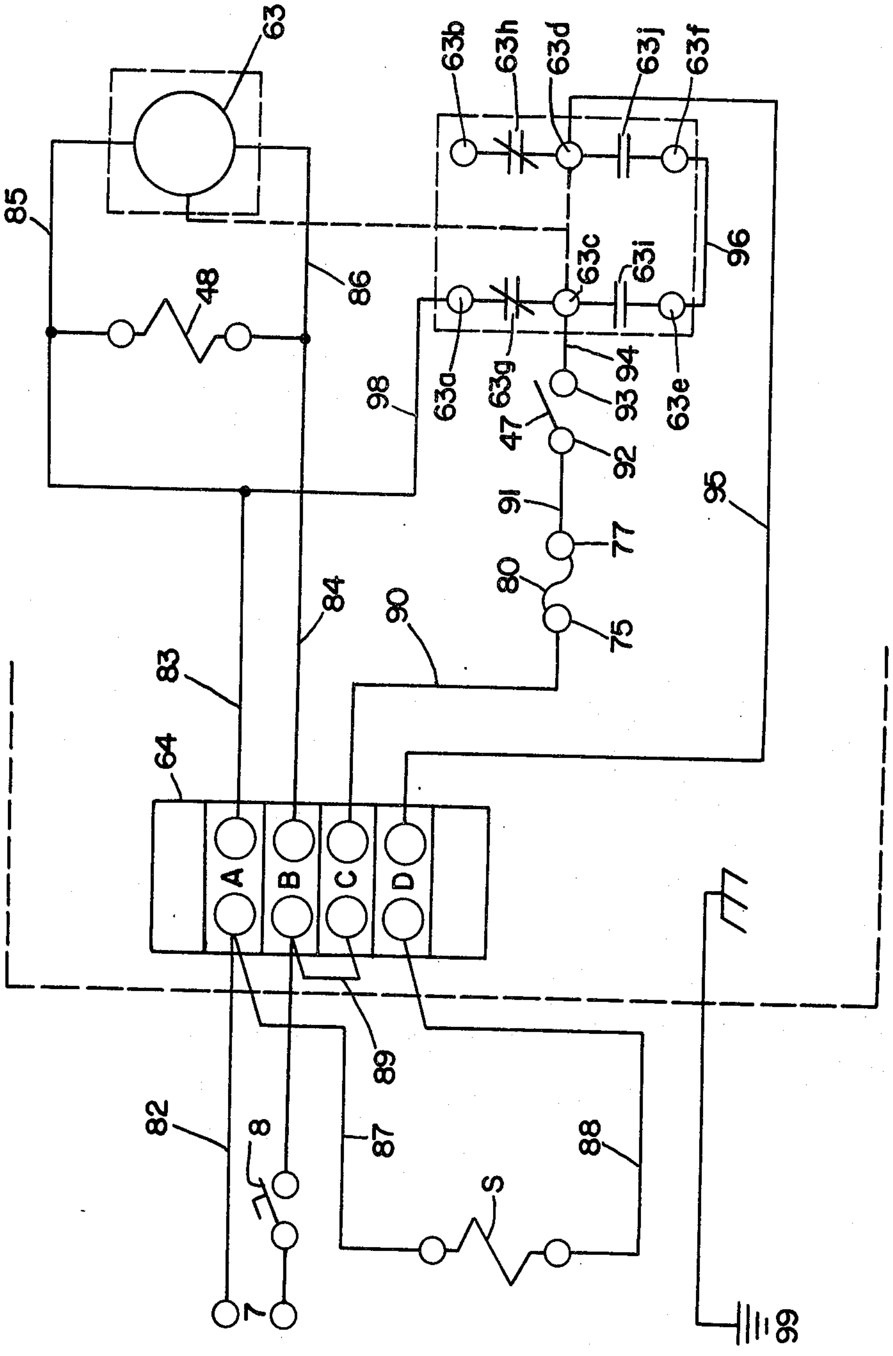
FIG. 8 is a wiring diagram of the device, and circuitry therefor.

Reference to the wiring diagram of FIG. 8 shows that one of the wires of the electric supply 7 is connected, as by a wire 82, to the terminal A of the terminal strip 64, while the other of the wires of the electric supply 7 is connected to the terminal B of the terminal strip 64 through the switch 8. The terminals A and B are connected, as by wires 83 and 84, to the solenoid 48, and by wires 85 and 86 to the relay 63.

The terminals A and D are connected, as by wires 87 and 88 to the trip solenoid S of the clutch (not shown) which actuates the ram or punch 5 of the press 1. The terminals B and C are connected to each other by a wire 89.

The terminal C is connected by a wire 90 to the terminal 75 of the fuse 80, and the terminal 77 of this fuse is connected, as by a wire 91, to the terminal 92 of the limit switch 47.

The relay 63 comprises the relay coil depicted by a circle in FIG. 8, the terminals $63a$, $63b$, $63c$, $63d$, $63e$, and $63f$, as well as the normally closed contacts $63g$ and $63h$, and the normally open contacts $63i$ and $63j$.

The other terminal 93 of the limit switch 47 is connected, as by wire 94, to the terminal $63c$ of the relay 63. Terminal $63d$ of the relay 63 is connected, as by wire 95, to the terminal D. Terminal $63c$ is connected through normally closed contact $63g$ to terminal $63a$, and thence through wires 98 and 83 to terminal A of the terminal strip 64.

A wire 96 interconnects terminals $63e$ and $63f$.

The housing or chassis H of the device is grounded, as at 99.

The use and operation of the safety mechanism may now be described as follows:

When the operator closes the switch 8, the solenoid 48 and the relay 63 are activated, permitting the shaft 22 and sensor loop 28 to be released and to descend by gravity. The sensor weighs only a few ounces and the drop is controlled to prevent discomfort to the fingers of the operator should they be in the path of the sensor.

If the sensor is obstructed by an object, such as the finger of the operator or a misplaced part, and thus is not permitted to complete its full travel, the control circuit to solenoid S (FIG. 8) remains open and the punch or ram 5 will not be activated. This results from the fact that the limit switch 47 cannot close, due to such obstruction, and the portion of the circuit which is controlled by the limit switch 47 and relay contacts $63i$ and $63j$ is not energized.

If the sensor encounters no obstacle and is permitted to travel its complete pre-selected distance, the terminal portion 44 of the actuator arm 43 engages the roller 45 of the closing arm 46 of the limit switch 47, closing this switch and completing, through the relay contacts 63*i* and 63*j*, the circuit controlled thereby, and energizing solenoid S and thus activating the ram or punch 5. The relay 63 is used to prevent the operator from cycling the machine by hand by pulling the sensor down manually.

The vertical position of the sensor or probe is adjustable to compensate for differences such as material thickness and height of the dies. This adjustment for height and stroke is permitted by adjustment of the clamp 24 axially of the shaft 22 and adjustment of the stroke adjusting collar 40 axially of the shaft 22.

Upon completion of the downstroke of the ram or punch and release of the switch 8 by the operator, the coil spring 55 contracts, thereby returning the sensor to its initial position preparatory to another cycle of operation of the press.

Among other improvements in the mechanism over the mechanism described in the aforesaid Grundy patent, are the following:

a. The device is essentially "fail-safe" for such conditions as failure of internal parts and improper usage by the operator. In other words, should any of the parts of the mechanism within the housing become loosened, break, or fall off its mounting, or should the limit switch 47 fail in its closed position, the fuse 80 will "blow," thereby breaking the circuit to the solenoid S, and preventing actuation of the ram 5. This fuse, as previously explained, is easily removable and replaceable from outside the locked housing. The limit switch 47 and normally closed contact 63*g* of relay 63 should never be closed at the same time. If this occurs, it is an indication of a malfunction of internal parts of the device, or improper usage of the device by the operator, rendering the device inoperative, due to blowing of the fuse 80.

b. In the aforesaid Grundy patent, the positional relationship between the actuating arm 23 and limit switch closing arm 24 of that patent is such that the arm 24 had a tendency to cause the arm 23 to "bounce" or "vibrate" upon reaching the end of the downstroke of the shaft 14 and to produce a tendency of the probe 11 to bounce. This "bounce" or "vibration" produced erratic operation of the ram 5. By repositioning of the limit switch, in the manner shown in FIG. 2 of the present application, and provision of the roller 45 on the switch closing arm 46, a combined rolling and wedging engagement between the terminal portion 44 of the arm 43 and roller 45 is effected on the downstroke of the shaft 22, as a result of which the bounce or vibration is eliminated and positive operation of the limit switch and probe or sensor is assured. It may be pointed out, in this connection, that contact between the terminal portion 44 of the arm 43 and the roller 45 is maintained for a short distance during the descent of the shaft 22, thereby insuring that the contact of switch 47 is closed and remains closed through this distance and at the final or terminal point of this descent of the portion 44 of the arm 43. As a result, if there is any upward movement caused by bounce of the sensor 28, the contacts of the switch 47 will remain closed during such bounce, thereby avoiding erratic operation of the press.

c. The tendency toward "bounce" is further reduced or minimized by reason of the fact that the down-travel of the probe shaft 22 is controlled by a positive stop which is obtained when the actuator collar 31 approaches the flange 19 and its movement is cushioned by the Neoprene rubber bumper or washer 33.

d. This arrangement or provision of the bottom stop bumper 33 permits adjustment of the device in a manner such that the beam 61 is not in contact with the roller 54, when the shaft 22 is in the down position. This further minimizes or eliminates bounce, since the spring 29 in the Grundy patent had a tendency to vibrate when elongated, which vibration was then transmitted through the beam 34 to the shaft 14, and thus amplified any tendency of the shaft 14 to bounce. This resulted from the fact that there was no provision in the Grundy patent for the actuator block 12 of that patent to be stopped on its downstroke by means other than the engagement of the switch actuator 23 with the closing arm 24 of the limit switch 24*a*.

e. The present design eliminates certain parts of the mechanism shown in the aforesaid Grundy patent, including the separate bearing blocks 16 and 17, the latch spring 34*a*, and the relay supporting bracket 36*a*, as well as the screws and other fasteners necessary to secure or support these parts.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a safety device of the character described, a housing, a probe shaft mounted in said housing for vertical reciprocal sliding movement, a sensor or probe supported by said probe shaft, a solenoid mounted on said housing and having an armature movable along an axis parallel with said probe shaft, a beam mounted for pivotal movement in said housing, and operatively connected at one end with said probe shaft, said beam movable in response to energization of said armature to permit said probe shaft and sensor or probe to fall by gravity, spring-actuated means operative in opposition to said armature for moving said beam to cause said probe shaft to be moved to a raised inoperative position, and means including an electrical circuit for controlling operation of a press or machine in response to said gravity fall, said circuit including a limit switch having a switch closing arm provided with a roller, and a switch actuator arm supported by said probe shaft and having a terminal inclined portion adapted to engage said roller, and to have a combined rolling and wedging engagement with the roller during said gravity fall, whereby bounce or vibration of the probe shaft and sensor is eliminated and positive operation of the limit switch and probe or sensor is assured.

2. A safety device, as defined in claim 1, wherein said terminal portion of said switch actuator arm is of a height such that it remains in engagement with said roller during a predetermined portion of the gravity fall of said probe shaft.

3. A safety device, as defined in claim 1, including means for preventing rotation of said probe shaft during its movements, said means comprising a guide rod within said housing, said guide rod being parallel with the axis of said probe shaft, said actuator arm having a recess within which said guide rod is received.

4. A safety device, as defined in claim 1, wherein said probe shaft has a flat surface inclined longitudinally to the axis of said probe shaft, and resiliently mounted braking means are provided within said housing and adapted to be engaged by said flat surface during gravity fall of said probe shaft, whereby to control or brake the downward movement of said shaft.

5. A safety device, as defined in claim 1, wherein said electrical circuit includes a relay, and a fuse operative to control the circuit to said relay, said fuse adapted to blow under predetermined conditions, including failure of the limit switch to function in its closed position.

6. A safety device, as defined in claim 5, wherein said fuse is mounted in an enclosure, which, in turn, is mounted in and extends through a wall of said housing, said fuse being removable from said enclosure without exposing the interior of said housing to view.

* * * * *